No. 840,960. PATENTED JAN. 8, 1907.
A. H. REID.
REGENERATIVE PASTEURIZING SYSTEM.
APPLICATION FILED MAY 25, 1906.

2 SHEETS—SHEET 2.

Witnesses:
Sidney P. Hollingsworth
L. E. Morrison

Inventor:
A. H. Reid
By P. T. Dodge
Atty.

UNITED STATES PATENT OFFICE.

ALBAN H. REID, OF PHILADELPHIA, PENNSYLVANIA.

REGENERATIVE PASTEURIZING SYSTEM.

No. 840,960.　　　Specification of Letters Patent.　　　Patented Jan. 8, 1907.

Application filed May 25, 1906. Serial No. 318,677.

*To all whom it may concern:*

Be it known that I, ALBAN H. REID, of Philadelphia, county of Philadelphia, and State of Pennsylvania, have invented a new and useful Improvement in Regenerative Pasteurizing Systems, of which the following is a specification.

This invention relates to the pasteurization and cooling of the pasteurized milk on the regenerative system, in which system the inflowing cool raw milk on its way to the pasteurizer is circulated in proximity to the outflowing hot milk from the pasteurizer, with the result that the temperatures of the two currents tend by their reciprocal action on each other to equalize, the cool incoming milk being raised in temperature and the hot outgoing milk being reduced in temperature.

The invention consists of an apparatus of improved form for accomplishing this result in a speedy and economical manner, which apparatus comprises as its essential features a series of superposed tubes, through which the incoming milk is circulated, a pasteurizer communicating with the tubes and receiving the milk therefrom, a means for discharging the pasteurized milk onto the exterior of the tubes, whereby in flowing down over the tubes the hot milk will by its proximity to the incoming cool milk flowing through the tubes impart heat thereto and be correspondingly reduced in temperature, with the result that by reciprocal action the temperature of the incoming milk will be raised and that of the outflowing milk reduced.

The invention consists also in combining with the series of superposed tubes through which the incoming raw milk is circulated a series of cooler-tubes arranged beneath the first series in position to receive on their outer surfaces the pasteurized milk flowing over the upper series, means being provided for circulating a cooling medium through the lower series of tubes, whereby the pasteurized milk after leaving the upper series of tubes will be subjected to a further cooling action and its temperature will be quickly reduced to the proper degree.

Figure 1:
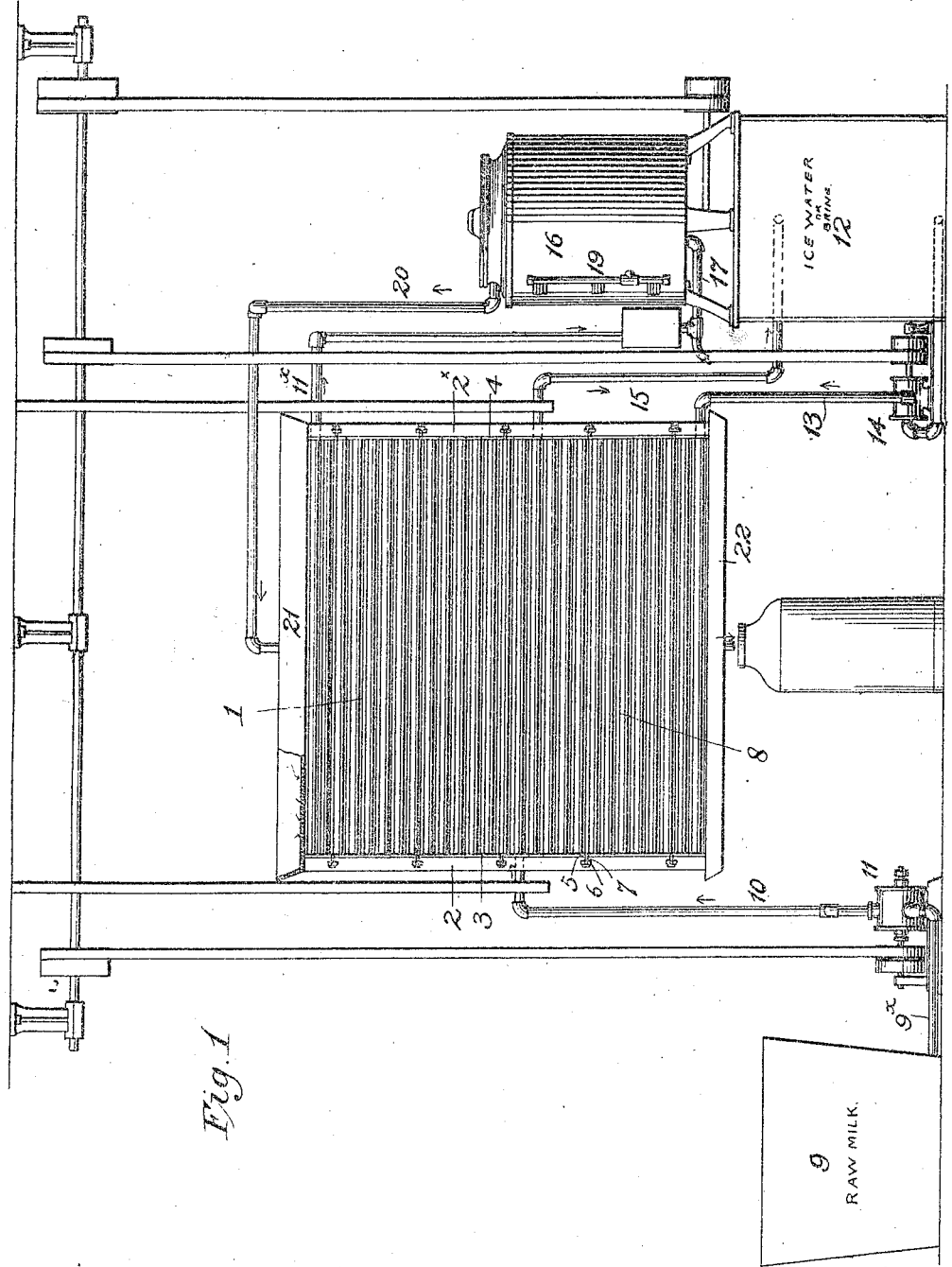
Figure 2:
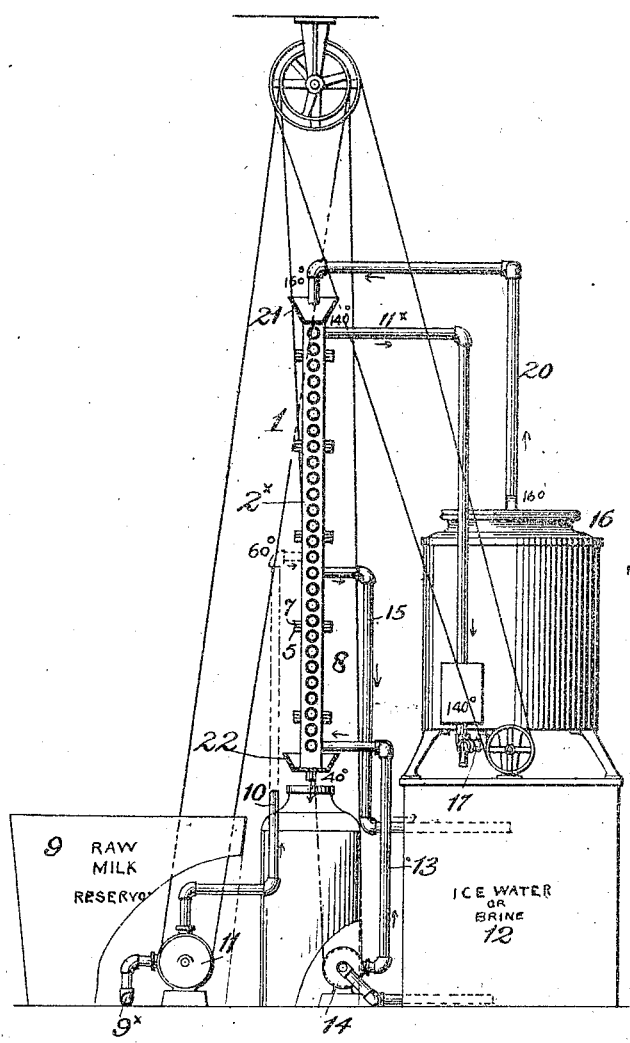
Figure 3:
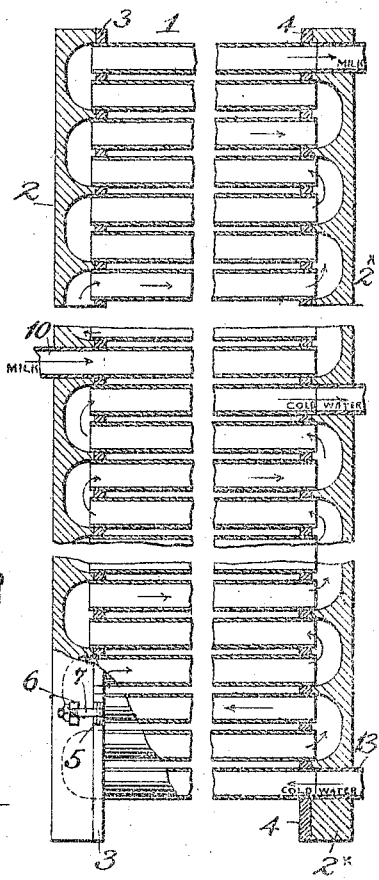

In the accompanying drawings, Figure 1 is a side elevation, partly in section, of my improved apparatus. Fig. 2 is a transverse sectional elevation of the same. Fig. 3 is a longitudinal sectional elevation, on an enlarged scale, of the two series of tubes, showing particularly the form and arrangement of the manifolds at the ends of the series.

Referring to the drawings, 1 represents a series of horizontally-arranged tubes disposed one over the other and communicating at their ends through manifolds 2 and $2^{\times}$ in such manner that the cool incoming raw milk may be circulated in a continuous course back and forth throughout the series. The tubes are mounted and sustained at their ends in vertical end plates 3 and 4, to which the manifolds are detachably connected by lugs 5 on the plates, lugs 6 on the manifolds, and a removable bolt 7 passing through the lugs, so that the manifolds may be detached to permit access to the passages therein and to the interior of the tubes for cleaning the same.

8 represents a second series of tubes similar in form and arrangement to the first and situated below the same, their ends being sustained in downward continuations of the end plates 3 and 4 and being connected by downward continuations of the manifolds in such manner that a continuous passage is formed back and forth throughout the tubes for the circulation of the cooling medium, the exterior of the two series of tubes presenting an upright cooling-surface over which the pasteurized milk flows from top to bottom, as will be presently described.

9 represents a receiving-vat for the raw milk to be treated, which vat is connected by pipe 10 with the lower tube of the upper series. This vat may be sustained in an elevated position above the tubes in order that the milk may be circulated by gravity through them, but I prefer to sustain the vat on the floor-level and to introduce into the connecting-pipe $9^{\times}$ a pump 11 for forcing the milk up into and through the tubes, the upper tube being extended through the manifold, where it is connected with a discharge-pipe $11^{\times}$.

12 represents a tank or reservoir for the cooling medium, such as ice-water or brine, which tank in the present instance is situated on the floor-level and is connected by pipe 13 with the lower tube of the lower series, a pump 14 being introduced in the connecting-pipe for the purpose of forcing the cooling medium upward through the tubes, the upper one of which is extended through the manifold and connected with a return-pipe 15.

16 represents a pasteurizer, which may be of any suitable form adapted to subject the milk to the proper pasteurizing process. The milk is introduced into the base of the pasteurizer by a pipe 17 and leaves the same by pipe 20, being subjected in its passage therethrough to a pasteurizing action. The pipe 20 discharges the pasteurized milk into a receiving-trough 21, arranged above the upper tube of the upper series and formed in its bottom with openings through which the milk flows onto the pipe. The pipe 17, through which the milk is introduced into the pasteurizer, is connected with the discharge-pipe 11×, so that after the milk flows through the upper series it enters the pasteurizer.

In the operation of my apparatus the raw milk, usually at a temperature of 60°, is forced from the receiving-vat and enters the lower tube of the upper series, and circulating upward through the tubes it leaves the same by the discharge-pipe 11×, being raised in its passage therethrough (by the flow of the pasteurized milk over said tubes) to a temperature of about 140°, at which temperature it enters the pasteurizer by pipe 17. In the pasteurizer the milk is raised by the pasteurizing action to a temperature of about 160° and is discharged by pipe 20 into the receiving-trough 21 at the upper end of the tubes. The milk from the trough flows downward over the exterior of the upper series of tubes and then passes to the exterior of the lower series, and is received at the bottom of the lower series in a trough 22, through which it is discharged into a suitable receiving vessel. The flow of the pasteurized milk at a temperature of 160° over the upper series of tubes raises the temperature of the incoming raw milk flowing through said tubes from 60° to 140° and is correspondingly cooled, and by its passage over the lower series of tubes through which the cooling medium is circulated it is further cooled and enters the receiving vessel at about 40°.

It will be observed that in my apparatus as illustrated and described the two series of tubes, by being arranged one over the other, present to the downflowing pasteurized milk a continuous cooling-surface, the first portion of the flow of the hot milk raising the temperature of the incoming raw milk circulated through the upper series of tubes, and the second portion of the flow of the pasteurized milk, now reduced in temperature, being subjected to a final cooling action by the lower series of tubes containing the circulating cooling medium.

The action of the apparatus is rapid and effective, and by reason of the reciprocal action of the two currents of different temperatures on each other the incoming milk is raised in temperature and the outgoing milk reduced in temperature, resulting in a great saving of fuel consumption.

The horizontal circulating-tubes arranged one above the other, as described, form, in effect, a series of horizontal circulating-passages arranged in the form of a flat upright body, through which circulating-passages the raw milk is circulated and over which body the pasteurized milk flows.

Having thus described my invention, what I claim is—

1. In a regenerative pasteurizing apparatus, the combination of a series of horizontal superposed tubes, a source of supply for the raw milk, a connection between said milk-supply and one end of said system of tubes, a pasteurizing apparatus, a connection between said pasteurizing apparatus and the other end of said system of tubes, and means for directing the pasteurized milk from the pasteurizer onto the top of the system of tubes.

2. In a regenerative pasteurizing system, the combination of an upper series of horizontal connected tubes arranged one above the other, a lower series of horizontal connected tubes similarly arranged and non-communicating with the first series, means for introducing the cold raw milk into the lower tube of the upper series, means for discharging the milk from the upper tube of said series, means for introducing a cooling medium into the lower tube of the lower series, means for discharging the cooling medium from the upper tube of said lower series, a pasteurizer connected with the upper tube of the upper series, and means for discharging the pasteurized milk onto the top of the upper series of tubes.

3. In a regenerative pasteurizing system, the combination of an upper series of horizontal superposed tubes communicating with each other, a lower series of horizontal superposed tubes communicating with each other but having no communication with the upper series, the said lower series being arranged vertically beneath the upper series with its upper end forming an external continuation of the lower end of the upper series, means for circulating the cold raw milk through the upper series, means for pasteurizing the milk after it leaves the tubes, means for flowing the pasteurized milk downward over the external surface of both series of tubes, and means for circulating a cooling medium through the lower series.

4. In a regenerative pasteurizing system, the combination of the upper series of horizontal superposed tubes communicating with each other, a lower series of horizontal superposed tubes communicating with each other and having no communication with the first, the said lower series being arranged vertically beneath the upper ones with its upper end forming a continuation of the lower end of the upper series, a source of supply for the raw milk, a connection between said milk-supply and one end of said upper series of tubes, a pasteurizing apparatus, a connection between said pasteurizing apparatus and the opposite end of the upper series of tubes, a source of supply for the cooling medium, a connection between said cooling-medium supply and one end of the lower series of tubes, a second connection between the opposite end of the lower series of tubes and the cooling-medium supply, and means for discharging the pasteurized milk onto the top of the upper series of tubes; whereby in flowing downward over said upper and lower series of tubes in succession, the pasteurized milk will be first reduced in temperature and will impart its heat to the incoming raw milk and will be finally further reduced in temperature to the proper degree for use.

In testimony whereof I hereunto set my hand, this 9th day of May, 1906, in the presence of two attesting witnesses.

ALBAN H. REID.

Witnesses:
W. A. MORSE,
MARY E. LOGAN.